(12) United States Patent
Davis et al.

(10) Patent No.: US 8,328,647 B2
(45) Date of Patent: Dec. 11, 2012

(54) TORQUE CONVERTER LEAF SPRING CONNECTIONS

(75) Inventors: Michael C. Davis, Sterling, OH (US); Craig Kneidel, Massillon, OH (US); Adam Uhler, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 259 days.

(21) Appl. No.: 12/695,269

(22) Filed: Jan. 28, 2010

(65) Prior Publication Data

US 2010/0197412 A1 Aug. 5, 2010

Related U.S. Application Data

(60) Provisional application No. 61/206,373, filed on Jan. 30, 2009.

(51) Int. Cl.
*F16D 3/52* (2006.01)

(52) U.S. Cl. .................................................. 464/100

(58) Field of Classification Search .......... 464/69, 464/81, 84, 98, 100, 101, 99; 192/3.28, 3.29, 192/3.3, 30 R, 70.18, 70.28; 29/428; 60/435, 60/469; 267/160, 163, 158; 24/457, 459
See application file for complete search history.

(56) References Cited

U.S. PATENT DOCUMENTS

| | | | |
|---|---|---|---|
| 1,971,881 A | 8/1934 | Tinnerman | |
| 2,191,292 A | 2/1940 | Spence, Jr. | |
| 4,562,636 A * | 1/1986 | Carmillet | 192/70.18 |
| 4,635,775 A | 1/1987 | Kohler | |
| 4,690,259 A * | 9/1987 | Naudin | 192/70.18 |
| 4,747,586 A * | 5/1988 | Reik | |
| 5,347,673 A | 9/1994 | Nickels, Jr. | |
| 5,477,950 A | 12/1995 | Maloof | |
| 5,480,012 A | 1/1996 | Polubinski | |
| 6,113,306 A * | 9/2000 | Allert | |
| 6,352,384 B1 | 3/2002 | Frisch et al. | |
| 6,390,263 B1 * | 5/2002 | Arhab | 192/3.29 |
| 6,702,082 B2 * | 3/2004 | Dorfler et al. | 192/70.18 |
| 6,948,602 B2 * | 9/2005 | Arhab et al. | 192/3.29 |
| 8,016,091 B2 * | 9/2011 | Heck et al. | 192/3.29 |
| 2001/0048860 A1 * | 12/2001 | Ross et al. | |
| 2002/0179396 A1 * | 12/2002 | Bach et al. | 192/70.18 |
| 2009/0084649 A1 * | 4/2009 | Kombowski et al. | 192/3.29 |

FOREIGN PATENT DOCUMENTS

WO  WO 2007/140756  * 12/2007

* cited by examiner

*Primary Examiner* — Gregory Binda
*Assistant Examiner* — Josh Skroupa
(74) *Attorney, Agent, or Firm* — Simpson & Simpson, PLLC (57) ABSTRACT

A connection for a torque converter including a cover, a piston plate, and at least one leaf spring having a first portion with a resilient segment and a second portion rotationally connected to one of the cover or the piston plate. The other of the cover or the piston plate comprises a first protrusion and the resilient segment grips the first protrusion. In an example embodiment, the second portion is riveted to the one of the cover or the piston plate. In an example embodiment, the one of the cover or the piston plate includes a second protrusion and the second portion includes a resilient segment that grips the second protrusion.

21 Claims, 5 Drawing Sheets

TORQUE CONVERTER LEAF SPRING CONNECTIONS

CROSS-REFERENCE TO RELATED APPLICATIONS

This application claims the benefit under 35 U.S.C. §119(e) of U.S. Provisional Application No. 61/206,373 filed Jan. 30, 2009 which application is incorporated herein by reference.

FIELD OF THE INVENTION

The invention relates generally torque converter leaf spring connections, and more specifically to leaf spring connections with gripping segments.

BACKGROUND OF THE INVENTION

The prior art teaches that leaf spring connections in torque converters are riveted to both a piston plate and a cover or drive plate with riveting tooling that requires access to both sides of the rivet. Therefore, the position of prior art leaf spring connections is limited to outside the outer diameter or inside the center bore of the piston plate. The prior art also teaches riveting to a drive plate that is later fixed to the cover or to a hub fixed to the cover.

BRIEF SUMMARY OF THE INVENTION

Example aspects of the present invention broadly comprise a connection for a torque converter including a cover, a piston plate, and at least one leaf spring having a first portion with a resilient segment and a second portion rotationally connected to one of the cover or the piston plate. In some example embodiments of the invention, the other of the cover or the piston plate comprises a first protrusion and the resilient segment grips the first protrusion. In an example embodiment of the invention, the second portion is riveted to the one of the cover or the piston plate. In an example embodiment of the invention, the one of the cover or the piston plate comprises a second protrusion and the second portion comprises a resilient segment that grips the second protrusion.

In some example embodiments of the invention, the first portion comprises an opening and the resilient segment is at least partially extendable into the opening. In an example embodiment of the invention, the first portion comprises an opening and the resilient segment comprises a first tab extending at least partially into the opening. In an example embodiment of the invention, the resilient segment comprises a second tab extending at least partially into the opening. In an example embodiment of the invention, the first protrusion comprises a body and a head, and a perimeter of the head is larger than a perimeter of the body. In an example embodiment of the invention, the opening comprises a portion configured such that the first protrusion is axially displaceable through the portion.

In some example embodiments of the invention, the resilient segment comprises a slot opening in a circumferential direction. In an example embodiment of the invention, the resilient segment comprises first and second extensions at least partially forming the slot. The first and second extensions are radially displaced to grip the first protrusion. In some example embodiments of the invention, the other of the cover or piston plate comprises a second protrusion and the at least one leaf spring comprises a third portion comprising an opening. In some example embodiments of the invention, the second protrusion is disposed in the opening. In an example embodiment of the invention, the second protrusion is circumferentially displaceable in the opening and the first protrusion is circumferentially displaceable in the slot. In an example embodiment of the invention, the at least one spring includes first and second springs, the grip protrusion is disposed in the opening for the first spring, and the resilient portion of the second spring grips the grip protrusion.

In some example embodiments of the invention, the resilient segment comprises a hook opening in a radial direction and the first protrusion is at least partially disposed within the hook. In some example embodiments of the invention, the other of the cover or piston plate comprises a second protrusion and the leaf spring comprises a second opening. The second protrusion is disposed in the second opening. In an example embodiment of the invention, the second protrusion is circumferentially disposable in the second opening. In an example embodiment of the invention, the at least one spring includes first and second springs, the grip protrusion is disposed in the opening for the first spring, and the resilient portion of the second spring grips the grip protrusion. In an example embodiment of the invention, the other of the cover or the piston plate comprises a third protrusion, the second leaf spring resilient segment grips the third protrusion, and the first protrusion is disposed in the second leaf spring opening.

Other example aspects of the present invention broadly comprise a connection for a torque converter including a cover, a piston plate and a leaf spring including a first portion having an opening and a resilient segment with first and second tabs at least partially extendable into the opening, and a second portion riveted to one of the cover or the piston plate The other of the cover or the piston plate including a protrusion disposed in the opening and the first and second tabs grip the protrusion.

Other example aspects of the present invention broadly comprise a connection for a torque converter including a cover, a piston plate, and a leaf spring including a first portion having an opening and a resilient segment with a first tab at least partially extendable into the opening, and a second portion riveted to one of the cover or the piston plate. The other of the cover or the piston plate includes a protrusion including a body and a head, a perimeter of the head is larger than a perimeter of the body, the body is disposed in the opening, the resilient segment grips the body, and the opening comprises a portion configured such that the protrusion is axially displaceable through the portion without deflecting the resilient segment.

Other example aspects of the present invention broadly comprise a connection for a torque converter including a cover, a piston plate, and a leaf spring including a first portion with a resilient segment having a slot opening in a circumferential direction, a second portion riveted to one of the cover or the piston plate, and an opening. The other of the cover or the piston plate includes first and second protrusions, the first protrusion is disposed in the slot, the resilient segment grips the first protrusion, and the second protrusion is disposed and circumferentially disposed in the opening.

Other example aspects of the present invention broadly comprise a connection for a torque converter including a cover, a piston plate, and a leaf spring including a first portion with a resilient segment having a hook opening in a radial direction, a second portion riveted to one of the cover or the piston plate, and an opening. The other of the cover or the piston plate includes first and second protrusions, the first protrusion is engaged with the hook, the hook grips the first protrusion, and the second protrusion is disposed in the opening.

Other example aspects of the present invention broadly comprise a method for connecting a leaf spring to a cover and a piston plate in a torque converter. A first step connects the leaf spring to one of the cover or the piston plate; a second step axially displaces the cover or the piston plate, and a third step grips a first protrusion of the other of the cover or the piston plate with a resilient segment of the leaf spring. An example embodiment of the invention includes a fourth step of displacing the cover or the piston plate in a circumferential direction. In one embodiment, the other of the cover or the piston plate includes a second protrusion and the leaf spring includes a second resilient segment and connecting the leaf spring to one of the cover or the piston plate includes gripping the second protrusion with the second resilient segment.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
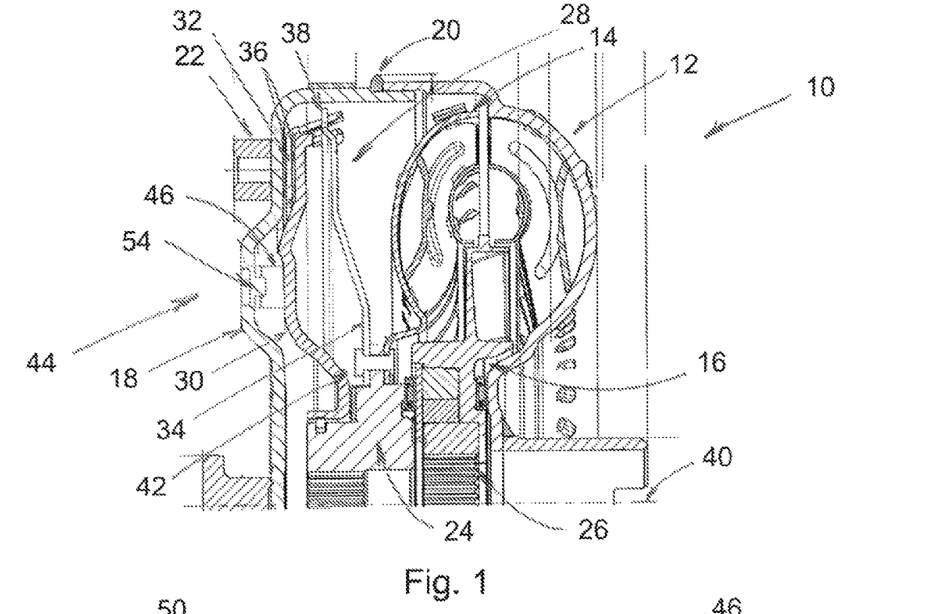
FIG. 1 is a top half section view of a torque converter according to an example aspect of the invention.
Figure 2:
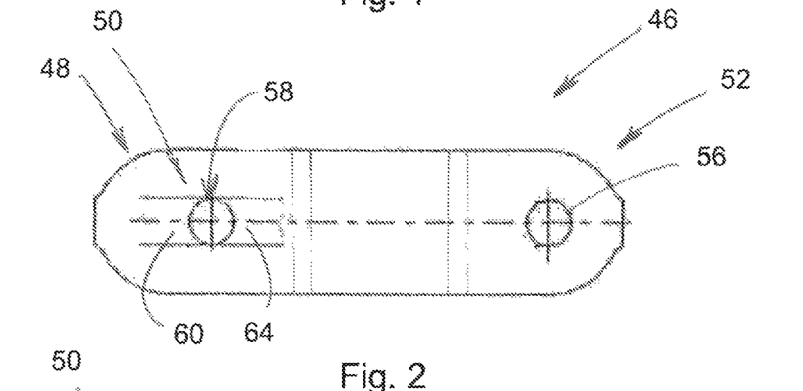
FIG. 2 is a top view of a leaf spring according to an example aspect of the invention.
Figure 3:
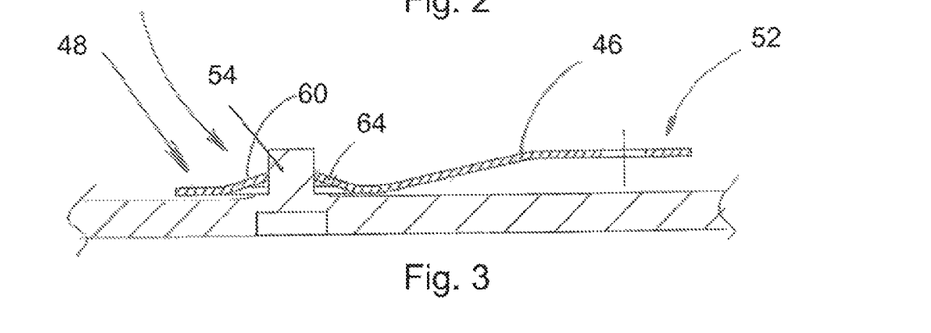
FIG. 3 is a section view of a leaf spring attachment including the leaf spring shown in FIG. 2.

The following description is made with reference to FIGS. 1-3. FIG. 1 is a top half section view of a torque converter according to an example aspect of the invention. FIG. 2 is a top view of leaf spring 46 according to an example aspect of the invention. FIG. 3 is a section view of a leaf spring attachment including leaf spring 46. Torque converter 10 includes pump 12, turbine 14 and stator 16. Cover 18 is drivingly engaged with pump 12 via weld 20, for example, and a prime mover (not shown) via lugs 22, for example. Turbine 14 is drivingly engaged with a transmission input shaft (not shown) via hub 24, for example. Stator 16 includes one-way clutch 26 drivingly engaged with a transmission stator shaft (not shown).

Clutch assembly 28 includes piston plate 30, friction ring 32 and clutch plate 34. Friction ring 32 includes friction material rings 36 disposed between cover 18 and friction ring 32, and piston plate 30 and friction ring 32, respectively. Friction ring 32 is drivingly engaged with clutch plate 34 at tabs 38, for example. Tabs 38 allow motion of friction ring 32 relative to clutch plate 34 along axis 40. Clutch plate 34 is drivingly engaged with turbine 14 and hub 24 at turbine hub rivet 42, for example. In some embodiments of the invention (not shown), clutch assembly 28 may include a damper as is commonly known in the art.

In some example embodiments of the invention, connection 44 for torque converter 10 includes cover 18, piston plate 30, and leaf spring 46. Leaf spring 46 includes portion 48 with resilient segment 50 and portion 52 rotationally connected to piston plate 30. By rotationally connected, or secured, we mean that portion 52 and the plate are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

Cover 18 includes protrusion 54 and resilient segment 50 grips protrusion 54. That is, once assembled, resilient segment 50 is compressively engaged with protrusion 54 and restricts removal of leaf spring 46 from protrusion 54. Protrusion 54 is larger than hole 58. Resilient segment 50 is configured such that assembly of resilient segment 50 with protrusion 54, for example, pushing the protrusion through hole 58, deflects resilient segment 50 as shown in FIG. 3. Elasticity of resilient segment 50, in particular, the elasticity of tabs 64, opposes the deflection and applies a compressive force to protrusion 54. Attempts to remove leaf spring 46 from protrusion 54 serve to decrease the installation space by decreasing the deflection thereby increasing the compressive engagement between protrusion 54 and leaf spring 46. Alternately stated, opening 58 is configured such that some portion of segment 150 must be deflected to accommodate a protrusion such as protrusion 54. In some example embodiments of the invention (not shown), leaf spring portion 52 is rotationally connected to cover 18 and piston plate 30 includes protrusion 54.

In an example embodiment of the invention, portion 52 is riveted to piston plate 30 through hole 56. In another example embodiment of the invention, piston plate 30 includes a protrusion (not shown) and portion 52 includes a resilient segment (not shown) that grips the piston plate protrusion, in a manner to similar to that described for portion 50 and protrusion 54. Piston plate 30 protrusion and portion 52 resilient segment are compressively engaged as described supra.

Figures 4, 4A, 4B, 5:
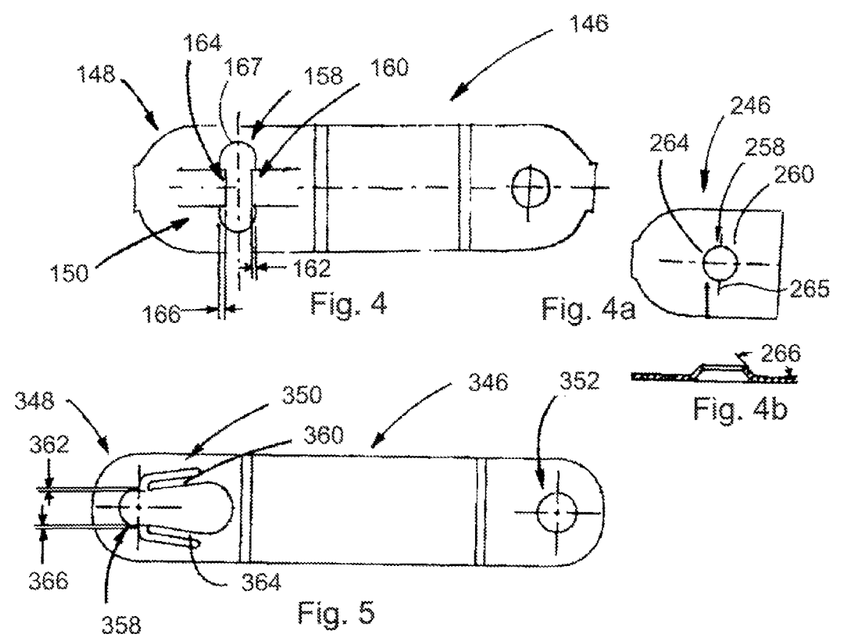
FIG. 4 is a top view of a leaf spring according to an example embodiment of the invention.
FIG. 5 is a top view of a leaf spring according to another example embodiment of the invention.

The following description is made with reference to FIG. 4. FIG. 4 is a top view of leaf spring 146 according to an example embodiment of the invention. FIG. 4A is a partial view of leaf spring 246 according to an example embodiment of the invention. FIG. 4B is a partial section view of leaf spring 246 shown in FIG. 4A.

In some example embodiments of the invention, portion 148 of leaf spring 146 includes opening 158 and resilient segment 150 partially extends into opening 158. In an example embodiment of the invention, portion 148 includes opening 158 and resilient segment 150 includes tab 160 extending into opening 158 (i.e., tab 160 extends into the opening by distance 162). As a result, the space available in opening 158 to accept a protrusion, for example, protrusion 54, is smaller than the space occupied by the protrusion. For example, the protrusion must force and deflect the tab out of the way. Thus, tab 160 compressively engages a corresponding protrusion (not shown) during assembly, as described supra. In an example embodiment of the invention, resilient segment 150 also includes tab 164, similar to tab 160, and extending into opening 158 (i.e., tab 164 extends into the opening by distance 166). Opening 158 may be a hole or a slot, for example. In any case, opening 158 is configured such that some portion of segment 150 must be deflected to accommodate a protrusion. A slotted opening as shown in FIG. 4 advantageously limits torque loading on tabs 160 and 164 during operation. When used in conjunction with a similarly configured protrusion (not shown) having minimal assembly clearance to opening 158, deflection of tabs 160 and 164 is limited to the amount of clearance between the protrusion and the slot. That is, the protrusion is sized to substantially match the opening and with a nominal clearance between the protrusion and portions 167 of opening 158 (portions not including the tab), such that when torque is applied to the assembly, the tabs deflect a nominal additional amount such that the protrusion is in direct contact with portions 167 and portions 167 carry most of the torque.

In another example embodiment of the invention (shown in FIGS. 4A and 4B), spring 246 includes angled surfaces 260 and 264 and slits 265. The angled surfaces form opening 258, which is smaller in extent than a protrusion to be inserted in then opening, similar to the arrangements described supra. The slits enable deflection of the angled surfaces when a protrusion is inserted in opening 258. Angled surfaces 260 and 264 are formed (at angle 266, for example) to ease assembly with the protrusion (not shown) when the protrusion (not shown) is inserted into opening 258 from below (as viewed in FIG. 4B). That is, forming angled surfaces 260 and 264 at angle 266 lessens the assembly deflection when leaf spring 246 is assembled with the protrusion (not shown). Furthermore, the forming of angled surfaces 260 and 264 increases stiffness and resists deflection, thereby increasing the ability of angled surfaces 260 and 264 to grip the protrusion (not shown).

Figure 6:
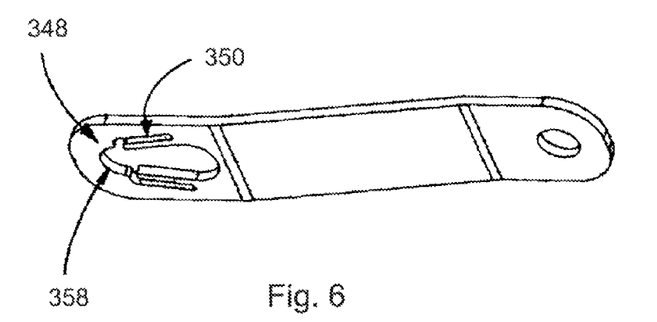
FIG. 6 is a perspective view of the leaf spring shown in FIG. 5.

The following description is made with reference to FIGS. 5 and 6. FIG. 5 is a top view of leaf spring 346 according to another example embodiment of the invention. FIG. 6 is a perspective view of leaf spring 346 shown in FIG. 5. Leaf spring 346 includes arms 360 and 364 extending into opening 358. Arms 360 and 364 extend into opening 358 by amounts 362 and 366, respectively. Arms 360 and 364 are configured to radially deflect when a protrusion (not shown) is inserted and contract against the protrusion (not shown) to compressively engage the protrusion (not shown) after the protrusion (not shown) is inserted, as described infra. For example, the space between the arms is less than the space required, between the arms, for a protrusion inserted in opening 358. Thus, the arms deflect and compress the protrusion when the protrusion is inserted in the opening.

FIG. 7 is a series of figures showing a method of assembling a connection according to an example aspect of the invention. FIG. 7A is a detail view of portion 348 of leaf spring 346 before assembly. FIG. 7B is a detail section view of portion 348 and protrusion 54 in cover 18 before assembly. FIG. 7C is a detail section view of portion 348 and protrusion 54 during assembly. FIG. 7D is a detail section view of portion 348 and protrusion 54 in an assembled condition. In some example embodiments of the invention, protrusion 54 includes body 68 and head 70. In an example embodiment of the invention, perimeter 72 of head 70 is larger than perimeter 74 of body 68. Although body 68 and head 70 are shown circular, body 68 and head 70 could be other shapes. In an example embodiment of the invention, opening 358 includes portion 376 configured such that protrusion 54 is axially displaceable through portion 376. That is, portion 376 of opening 358 is large enough to enable head 70 to be inserted through portion 376.

Figure 7A:
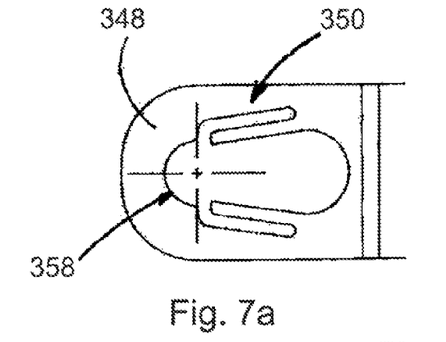
FIG. 7 is a series of figures showing a method of assembling a connection according to an example aspect of the invention.
Figure 7B:
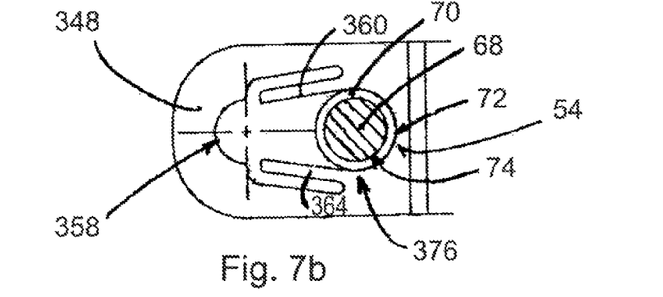
Figure 7C:
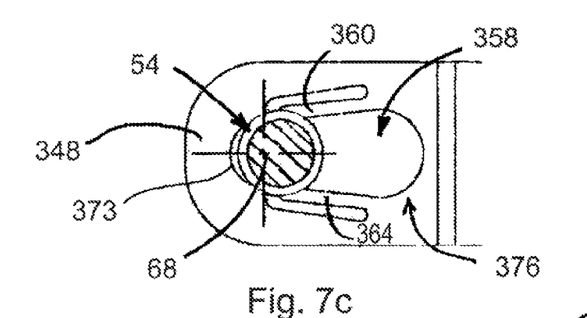
Figure 7D:
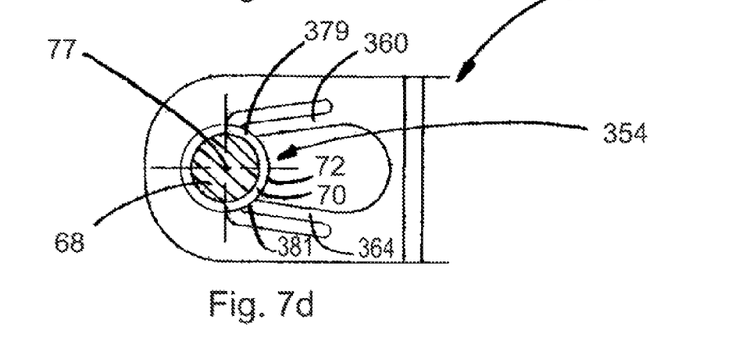

Assembly of leaf spring 346 and protrusion 56 proceeds as follows. Head 70 of protrusion 56 is inserted into portion 376 of opening 358. Because portion 376 is configured such that perimeter 72 of head 70 is axially displaceable through portion 376, leaf spring 346 is inserted onto protrusion 56 with minimal effort. The resulting arrangement of portion 348 of leaf spring 346 and protrusion 56 is shown in FIG. 7B. Protrusion 56 is displaced in opening 358 towards arms 360 and 364, or spring 358 is displaced in such that the arms 360 and 364 move toward the protrusion. As described supra, arms 360 and 364 extend into opening 358 to contact body 68 of protrusion 56. Further relative displacement of protrusion 56 and opening 358 displaces and deflects arms 360 and 364 as shown in FIG. 7C. In FIG. 7D, center 77 of body 68 is displaced beyond tips 379 and 381 of arms 360 and 364, respectively. The deflection of the arms noted supra causes the arms to compressively engage and grip the protrusion. In addition, the arms exert force on the protrusion forcing the protrusion against end 373 of the opening. Perimeter 72 of head 70 restricts axial displacement of protrusion 56 once assembled.

Figures 8, 9:
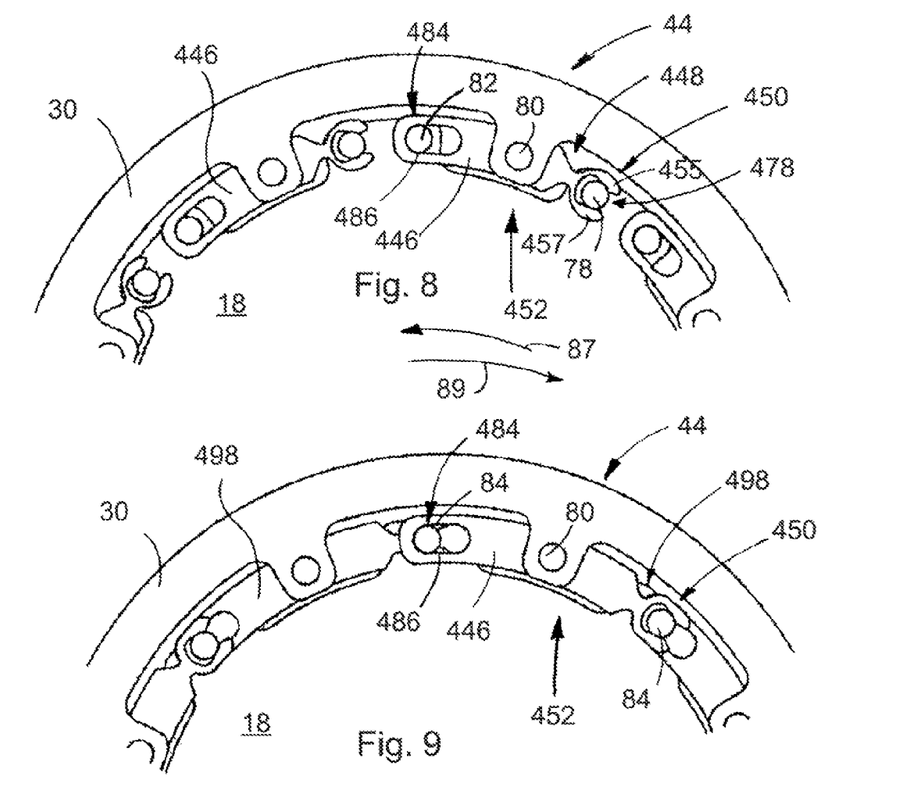
FIG. 8 is a detail view of the torque converter connection shown in FIG. 1 according to an example aspect of the invention shown with portions of the piston plate and cover removed for clarity.
FIG. 9 is a detail view of the torque converter connection shown in FIG. 1 according to another example aspect of the invention shown with portions of the piston plate and cover removed for clarity.

The following description is made with reference to FIG. 8. FIG. 8 is a detail view of a torque converter connection 44 shown in FIG. 1 according to an example aspect of the invention shown with portions of piston plate 30 and cover 18 removed for clarity. Connection 44 includes cover 18, piston plate 30, and leaf spring 446. Leaf spring 446 includes portion 448 with resilient segment 450 and portion 452 rotationally connected to piston plate 30 via rivet 80, for example. Cover 18 includes protrusion 78 and resilient segment 450 grips protrusion 78. In some example embodiments of the invention (not shown), leaf spring portion 452 is rotationally connected to cover 18, and piston plate 30 includes protrusion 78.

In some example embodiments of the invention, resilient segment 450 includes slot 478 opening in a circumferential direction. In an example embodiment of the invention, resilient segment 450 includes extensions 455 and 457 partially forming slot 478. Extensions 455 and 457 are radially displaced to grip protrusion 78. For example, the space between the distal ends of the extensions is less than the space required, between the distal ends, for a protrusion inserted in slot 478. Thus, the extensions deflect and compressively engage the protrusion when the protrusion is inserted in the slot.

In some example embodiments of the invention, cover 18 includes protrusion 82 and leaf spring 446 includes portion 484 with opening 486. In an example embodiment of the invention, protrusion 82 is disposed in opening 486. In an example embodiment of the invention, protrusion 82 is circumferentially disposable in opening 486. In an example embodiment of the invention, protrusion 78 is circumferentially disposable in slot 478. For example, the distal ends of the extensions prevent the protrusion from exiting the opening, but the opening is otherwise large enough to accommodate limited circumferential displacement of the protrusion in the opening. Circumferential displacement of protrusion 82 in opening 486 allows positioning of resilient segment 450 axially aligned with and circumferentially adjacent to protrusion 78 before assembly. Once assembled, combination of protrusion 82 in opening 486 and gripping of protrusion 78 by resilient segment 450 advantageously transmits a driving torque for torque converter 10 without rattle. For example, protrusion 82 is in contact with end 485 of opening 486. Therefore, when torque is applied to the cover in direction 87, the protrusion does not need to move to contact spring 446 to begin transmitting the torque to the spring. Thus, there is no rattle or noise created by movement of the protrusion to contact the spring. For example, protrusion 78 is gripped and held in place by the extensions for slot 478. Therefore, when torque is applied to the cover in direction 89, the protrusion does not need to move to contact spring 446 to begin transmitting the torque to the spring. Thus, there is no rattle or noise created by movement of the protrusion to contact the spring. When protrusions 78 and 82 are disposed on cover 418, arrow 87 would generally indicate a drive direction and arrow 89 would generally indicate a coast direction for torque converter 10.

The following description is made with reference to FIG. 9. FIG. 9 is a detail view of a torque converter connection 44 shown in FIG. 1 according to another example aspect of the invention shown with portions of piston plate 30 and cover 18 removed for clarity. In FIG. 9, the opposing ends of adjacent springs 498 are overlapped. For example, portion 484 for one spring is overlapped with portion 450 of an adjacent spring. In general spring 498 has the same features as spring 448, for example, segment 450, but the circumferential length of spring 498 has been increased to accommodate the overlapping described above. For example, the circumferential distance from slot 478 to opening 486 is greater in spring 498 than in spring 448. Also, the number of protrusion on the cover is reduced compared to FIG. 8. For example, a single protrusion 54 takes the place of protrusions 78 and 82 in FIG. 8.

Figure 10:
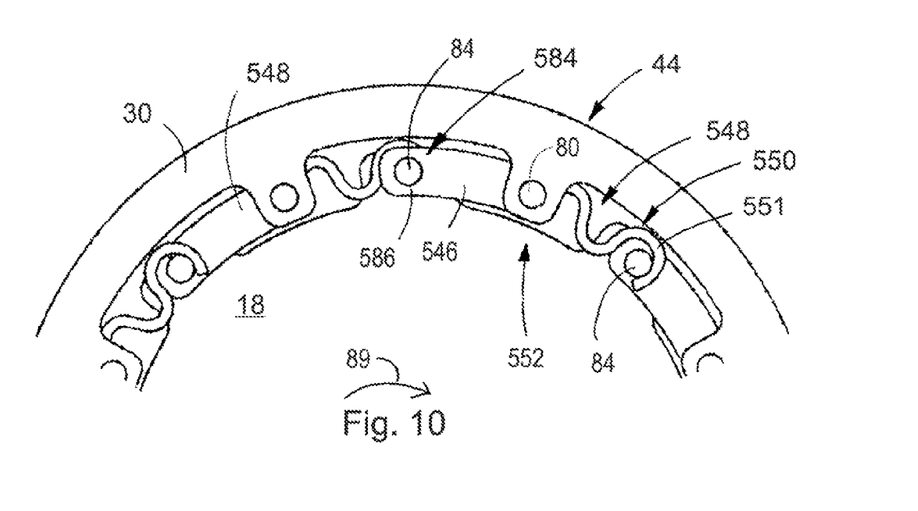
FIG. 10 is a detail view of the torque converter connection shown in FIG. 1 according to a further example aspect of the invention shown with portions of the piston plate and cover removed for clarity; and, FIG. 11 is a flow chart illustrating a method for connecting a leaf spring to a cover and a piston plate in a torque converter according to an example aspect of the invention.

The following description is made with reference to FIG. 10. FIG. 10 is a detail view of a torque converter connection 44 shown in FIG. 1 according to a further example aspect of the invention shown with portions of piston plate 30 and cover 18 removed for clarity. In some example embodiments of the invention, leaf spring 546 includes resilient segment 550 with hook 551 opening in a radial direction. In some example embodiments of the invention, cover 18 includes protrusion 54, leaf spring 546 includes portion 584 with opening 586, and protrusion 54 is disposed in opening 586. In an example embodiment of the invention (not shown), protrusion 54 is circumferentially displaceable in opening 586. In an example embodiment of the invention, leaf spring 546 includes portion 552 rotationally connected to piston plate 530 via rivet 80, for example.

Hook 551 is resilient in a circumferential direction. After protrusion 84 is inserted into opening 561 formed by the hook, the cover or spring 546 are circumferentially displaced with respect to each other so that the protrusion is urged against the hook in direction 89. Due to the resiliency of the hook, the hook resists the movement of the protrusion and thus compressively engages and grips the protrusion. In FIG. 10, the opposing ends of adjacent springs 546 are overlapped. For example, portion 584 for one spring is overlapped with portion 550 of an adjacent spring.

The following description is made with reference to FIGS. 1-10. In an example embodiment of the invention, connection 44 for torque converter 10 includes cover 18, piston plate 30, and leaf spring 46. Leaf spring 46 includes portion 48 having opening 58 and resilient segment 50 with tabs 60 and 64 extendable into opening 58. Leaf spring further includes portion 52 riveted to piston plate 30, cover 18 includes protrusion 54 disposed in opening 58 and tabs 60 and 64 grip protrusion 54.

In another example embodiment of the invention, connection 44 for torque converter 10 includes cover 18, piston plate 30, and leaf spring 146. Leaf spring 146 includes portion 148 having opening 158 and resilient segment 150 with tabs 160 and 164 extendable into opening 158. Leaf spring 146 further includes portion 152 riveted to piston plate 30, cover 18 includes protrusion 54 disposed in opening 158, and tabs 160 and 164 grip protrusion 54.

In another example embodiment of the invention, connection 44 for torque converter 10 includes cover 18, piston plate 30, and leaf spring 346. Leaf spring includes portion 348 having opening 358 and resilient segment 350 with tab 360 extendable into opening 358. Leaf spring 346 further includes portion 352 riveted to piston plate 30 and cover 18 includes protrusion 56 having body 68 and head 70. Perimeter 76 of head 70 is larger than perimeter 74 of body 68 and body 68 is disposed in opening 358. Resilient segment 350 grips body 68 and opening 350 includes portion 376 configured such that protrusion 56 is axially displaceable through portion 376 without deflecting resilient segment 350.

Figure 11:
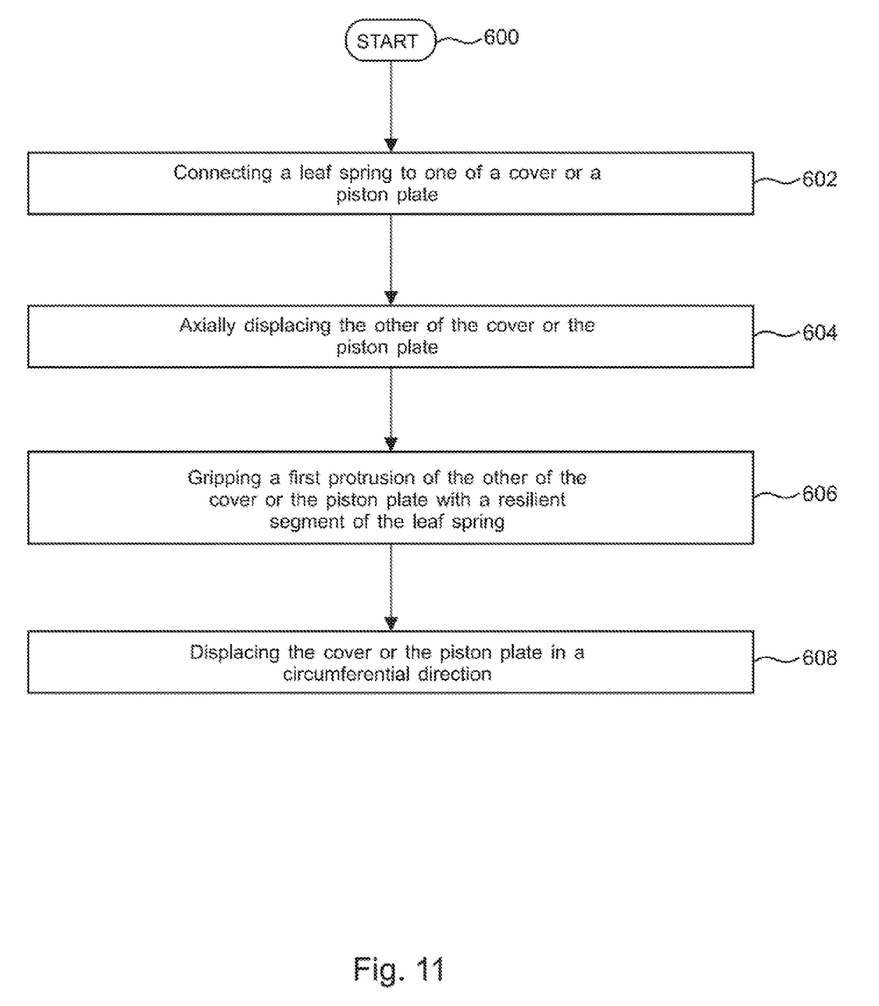

The following description is made with reference to FIG. 11. FIG. 11 is a flow chart illustrating a method for connecting a leaf spring to a cover and a piston plate in a torque converter according to an example aspect of the invention. Although the method in FIG. 11 is depicted as a sequence of numbered steps for clarity, no order should be inferred from the numbering unless explicitly stated. The method starts at Step 600. Step 602 connects the leaf spring to one of the cover or the piston plate. Step 604 axially displaces the cover or the piston plate. Step 606 grips a first protrusion of the other of the cover or the piston plate with a resilient segment of the leaf spring. Step 608 displaces the cover or the piston plate in a circumferential direction. In one embodiment, the other of the cover or the piston plate includes a second protrusion and the leaf spring includes a second resilient segment and connecting the leaf spring to one of the cover or the piston plate includes gripping the second protrusion with the second resilient segment.

Although the foregoing description described a particular configuration of protrusions disposed on a cover, the scope of the present invention is not limited to that configuration only, and broadly construed, alternatively can also include different numbers of protrusions and/or protrusions disposed on a piston plate. Furthermore, although particular shapes and configurations of tabs and resilient elements are shown, the scope of the present invention is not limited to those configurations only, and broadly construed, alternatively can also include different shapes and configurations of tabs and resilient elements. Although a present invention torque converter connection is shown with a particular torque converter configuration, it should be understood that the torque converter connection is not limited to the torque converter configuration shown and that other torque converter configurations are included in the spirit and scope of the claimed invention.

The disclosed connection does not limit the radial position of the leaf spring, thereby addressing capacity and/or durability compromises common in the prior art. Furthermore, the connection is described without a drive plate or hub fixed to the cover. Elimination of the drive plate and extra assembly reduces expense of the torque converter and frees valuable axial space.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What is claimed is:

1. A connection for a torque converter comprising:
   a cover for the torque converter;
   a piston plate for the torque converter; and
   at least one leaf spring comprising:
      a first portion with a resilient segment including first and second extensions extending in a circumferential direction and forming a space opening in the circumferential direction; and
      a second portion rotationally connected to one of the cover or the piston plate, wherein:
         the other of the cover or the piston plate comprises a first protrusion;
         the first and second extensions exert respective compressive force toward the first protrusion to engage and grip the first protrusion; and
         and a circumferential direction is defined by a line orthogonal to an axis of rotation for the torque converter and at a uniform distance from the axis of rotation.

2. The connection of claim 1, wherein the second portion is riveted to the one of the cover or the piston plate.

3. The connection of claim 1, wherein the one of the cover or the piston plate comprises a second protrusion and the second portion comprises a resilient segment that grips the second protrusion.

4. The connection of claim 1, wherein the first portion comprises an opening and the resilient segment is at least partially extendable into the opening.

5. The connection of claim 4, wherein the resilient segment comprises a first tab extending at least partially into the opening.

6. The connection of claim 4, wherein the resilient segment comprises first and second tabs extending at least partially into the opening.

7. The connection of claim 4, wherein the opening comprises a portion configured such that the first protrusion is displaceable through the portion without deflecting the resilient segment.

8. The connection of claim 1, wherein the first protrusion comprises a body and a head, and a perimeter of the head is larger than a perimeter of the body.

9. The connection of claim 1, wherein the resilient segment comprises a slot opening in a circumferential direction.

10. The connection of claim 9 wherein the resilient segment comprises first and second extensions at least partially forming the slot and wherein the first and second extensions are radially displaced to grip the first protrusion.

11. The connection of claim 9 wherein the other of the cover or piston plate comprises a second protrusion, the at least one leaf spring comprises a third portion comprising an opening, and wherein the protrusion is disposed in the opening.

12. The connection of claim 11, wherein the second protrusion is circumferentially displaceable in the opening and the first protrusion is circumferentially displaceable in the slot.

13. The connection of claim 11, wherein the at least one spring includes first and second springs, wherein the first protrusion is disposed in the opening for the first spring, and wherein the resilient portion of the second spring grips the first protrusion.

14. The connection of claim 1, wherein the resilient segment comprises a hook opening in a radial direction and the first protrusion is at least partially disposed within an opening formed by the hook.

15. The connection of claim 14 wherein the other of the cover or piston plate comprises a second protrusion, the at least one leaf spring comprises a second opening, and the second protrusion is disposed in the second opening.

16. The connection of claim 15, wherein the second protrusion is circumferentially disposable in the second opening.

17. The connection of claim 16, wherein the at least one spring includes first and second springs, wherein the first protrusion is disposed in the opening for the first spring, and wherein the resilient portion of the second spring grips the first protrusion.

18. A connection for a torque converter comprising:
   a cover;
   a piston plate; and
      a leaf spring comprising: a first portion with a resilient segment having a slot passing through the first portion, fully surrounded by the first portion, and extending further in a circumferential direction than in a radial direction; a second portion connected to one of the cover or the piston plate with a rivet; and an opening, wherein the other of the cover or the piston plate comprises first and second protrusions, the first protrusion is disposed in the slot, the resilient segment grips the first protrusion, the second protrusion is disposed and circumferentially displaceable in the opening, the rivet and the first and second protrusions are at a same distance orthogonal to an axis of rotation for the torque converter, a circumferential direction is defined by a line orthogonal to an axis of rotation for the torque converter and at a uniform distance from the axis of rotation, and a radial direction is orthogonal to the axis of rotation.

19. A method for connecting a leaf spring to a cover and a piston plate in a torque converter, the leaf spring including a first portion with a resilient segment including first and second extensions extending in a direction and forming a space opening in the direction, comprising the steps of:

connecting the leaf spring to one of the cover or the piston plate;

axially displacing the cover or the piston plate;

engaging a first protrusion on the other of the cover plate or the piston plate with the space;

rotating the cover or the piston plate in a first direction such that the first protrusion enters the space and expands the space;

continuing to rotate the cover or the piston plate in the first direction such that the space contracts; and exerting, using the first and second extensions, respective compressive forces toward the first protrusion to engage and grip the first protrusion.

20. The method of claim 19 further comprising the step of displacing the cover or the piston plate in a circumferential direction.

21. The method of claim 19 wherein the other of the cover or the piston plate comprises a second protrusion and the leaf spring includes a second resilient segment and wherein connecting the leaf spring to one of the cover or the piston plate includes gripping the second protrusion with the second resilient segment.

* * * * *